United States Patent
Chu-Carroll et al.

(10) Patent No.: US 9,529,845 B2
(45) Date of Patent: Dec. 27, 2016

(54) CANDIDATE GENERATION IN A QUESTION ANSWERING SYSTEM

(71) Applicant: International Business Machines Corporation, Armonk, NY (US)

(72) Inventors: Jennifer Chu-Carroll, Dobbs Ferry, NY (US); James J. Fan, Mountain Lakes, NJ (US); David A. Ferrucci, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/721,166

(22) Filed: May 26, 2015

(65) Prior Publication Data

US 2015/0254244 A1   Sep. 10, 2015

Related U.S. Application Data

(63) Continuation of application No. 12/191,251, filed on Aug. 13, 2008, now abandoned.

(51) Int. Cl.
*G06F 17/30* (2006.01)
*G06F 17/27* (2006.01)

(52) U.S. Cl.
CPC ..... *G06F 17/3043* (2013.01); *G06F 17/30401* (2013.01); *G06F 17/30654* (2013.01); *G06F 17/30864* (2013.01); *G06F 17/30929* (2013.01); *G06F 17/278* (2013.01)

(58) Field of Classification Search
CPC ............... G06F 17/30401; G06F 17/30929
USPC ......................................................... 707/722
See application file for complete search history.

(56) References Cited

U.S. PATENT DOCUMENTS

| | | | | |
|---|---|---|---|---|
| 2003/0033288 A1* | 2/2003 | Shanahan | ........... | G06F 17/3064 |
| 2003/0233929 A1* | 12/2003 | Agnihotri | ......... | G06F 17/30796 84/609 |
| 2004/0167889 A1* | 8/2004 | Chang | ............... | G06F 17/30321 |
| 2006/0085750 A1* | 4/2006 | Easton, Jr. | ............ | G06F 9/4446 715/708 |
| 2006/0253431 A1* | 11/2006 | Bobick | ............... | G06F 17/2795 |

(Continued)

FOREIGN PATENT DOCUMENTS

WO   2006132793 A2   12/2006

OTHER PUBLICATIONS

Article entitled "IBM's Piquant II in Trec2005" by Chu-Carroll et al. dated Feb. 5, 2006.*

(Continued)

*Primary Examiner* — Mahesh Dwivedi
(74) *Attorney, Agent, or Firm* — Cantor Colburn LLP; William Stock

(57) ABSTRACT

An aspect of candidate answer generation in a question answering system includes receiving at least one document or passage responsive to a search of an information source. The search is implemented based on a query formulated from a natural language query. A further aspect includes receiving provenance information for the at least one document or passage, searching a semi-structured source of information based on the provenance information, retrieving a substructure corresponding to the at least one document or passage from the semi-structured source of information, and returning the substructure as a candidate answer to the natural language query.

6 Claims, 2 Drawing Sheets

(56) References Cited

U.S. PATENT DOCUMENTS

| | | | | |
|---|---|---|---|---|
| 2007/0005566 | A1* | 1/2007 | Bobick | G06F 17/2795 |
| 2007/0094285 | A1* | 4/2007 | Agichtein | G06F 17/30398 |
| 2007/0136246 | A1* | 6/2007 | Stenchikova | G06F 17/279 |
| 2007/0136256 | A1 | 6/2007 | Kapur et al. | |
| 2007/0240031 | A1* | 10/2007 | Zhao | G06F 17/3071 |
| | | | | 715/205 |
| 2008/0021701 | A1* | 1/2008 | Bobick | G06F 17/2745 |
| | | | | 704/9 |
| 2009/0012937 | A1* | 1/2009 | Lee | G06F 17/30867 |
| 2009/0106223 | A1* | 4/2009 | Meyerzon | G06N 3/02 |
| 2009/0287678 | A1* | 11/2009 | Brown | G06F 17/30654 |
| 2009/0293687 | A1* | 12/2009 | Nino | B25B 23/1427 |
| | | | | 81/476 |
| 2013/0031122 | A1* | 1/2013 | Riezler | G06F 17/30672 |
| | | | | 707/760 |

OTHER PUBLICATIONS

Article entitled "Improving Complex Interactive Question Answering with Wikipedia Anchor Text" by MacKinnon et al. dated Mar. 2008.*
MacKinnon et al., "Improving Complex Interactive Question Answering with Wikipedia Anchor Text" Mar. 2008, 9 pages.
Prager et al., "Question Answering by Predictive Annotation" an excerpt from Advances in Open Domain Question Answering, Jan. 2006, pp. 307-347.
Rohini et al., "Extracting Exact Answers to Questions Based on Structural Links," Air Force Research Laboratory nformation Directorate (AFRL/IF), Rome, NY; under contract F30602-00-C and F30602-00-C-0090, 9 pages, Aug. 31, 2002.

\* cited by examiner

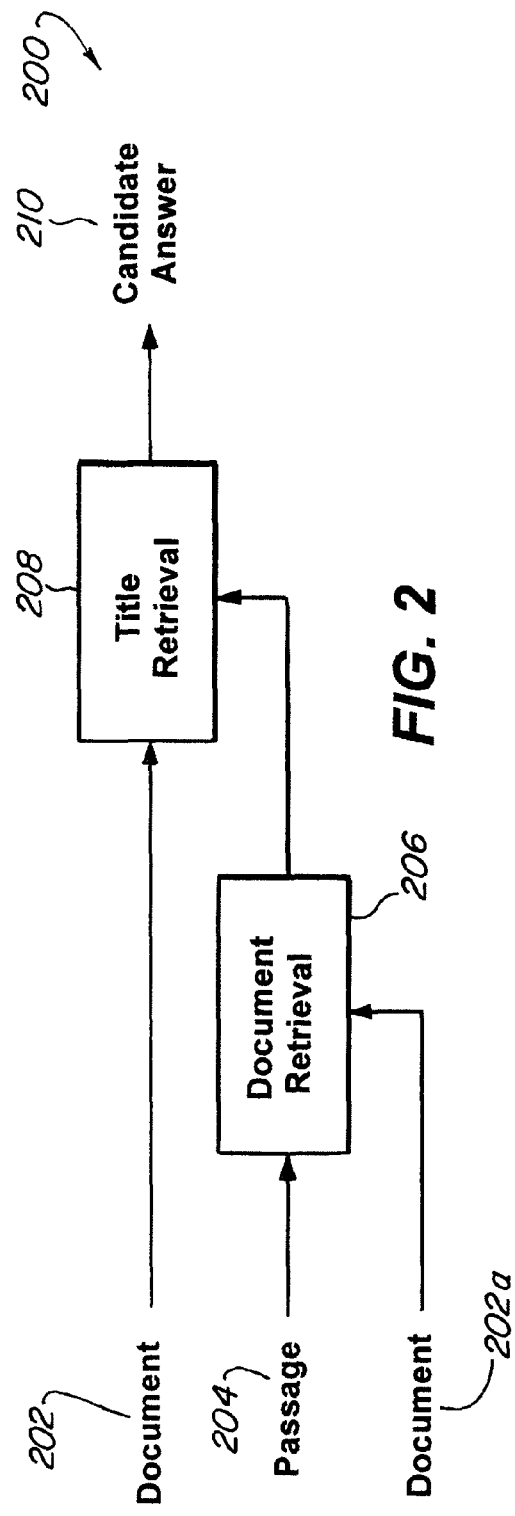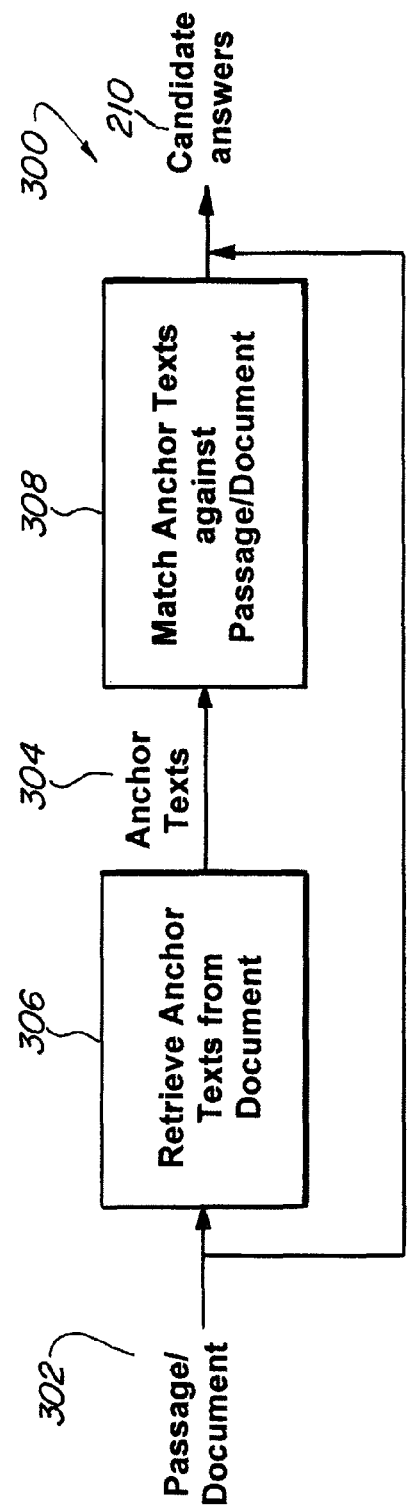
FIG. 2
FIG. 3

CANDIDATE GENERATION IN A QUESTION ANSWERING SYSTEM

DOMESTIC PRIORITY

This application is a continuation of U.S. patent application Ser. No. 12/191,251, filed Aug. 13, 2008, the content of which is incorporated by reference herein in its entirety.

BACKGROUND

The present disclosure relates generally to question answering systems used to generate candidate answers, and more specifically, to candidate answer generation that utilizes a heterogeneous collection of structured, semi-structured, and unstructured information resources.

Most question answering (QA) systems suffer from two significant deficiencies. First, the systems rely on the question analysis component correctly identifying the semantic type of the answer and the named entity recognizer correctly identifying the correct answer as that semantic type. Failure at either stage produces an error from which the system cannot recover.

Second, most QA systems are not amenable to questions without answer types, such as "What was the Parthenon converted into in 1460?" For such questions, oftentimes all noun phrases from the search output are extracted, leading to a large number of extraneous and at times non-sensible candidate answers in the context of the question.

SUMMARY

Embodiments described herein provide a method for candidate answer generation in a question answering system. The method includes receiving at least one document or passage responsive to a search of an information source. The search is implemented based on a query formulated from a natural language query. The method also includes receiving provenance information for the at least one document or passage, searching a semi-structured source of information based on the provenance information, retrieving a substructure corresponding to the at least one document or passage from the semi-structured source of information, and returning the substructure as a candidate answer to the natural language query.

A system for candidate answer generation in a question answering system is also provided.

The present disclosure, both as to its organization and manner of operation may best be understood by reference to the following description, taken in connection with the accompanying drawings.

BRIEF DESCRIPTION OF THE DRAWINGS

The foregoing features and other features of the present invention will now be described with reference to the drawings. In the drawings, the same components have the same reference numerals. The embodiments are intended to illustrate, but not to limit the invention. The drawings include the following Figures:

FIG. 2 is a flow diagram illustrating an approach to candidate answer generation by leveraging structural information in semi-structured resources, such as the title of a document; and FIG. 3 is a flow diagram illustrating an approach to candidate answer generation by leveraging structural information in semi-structured resources, such as anchor texts in a document.

DETAILED DESCRIPTION

Figure 1:
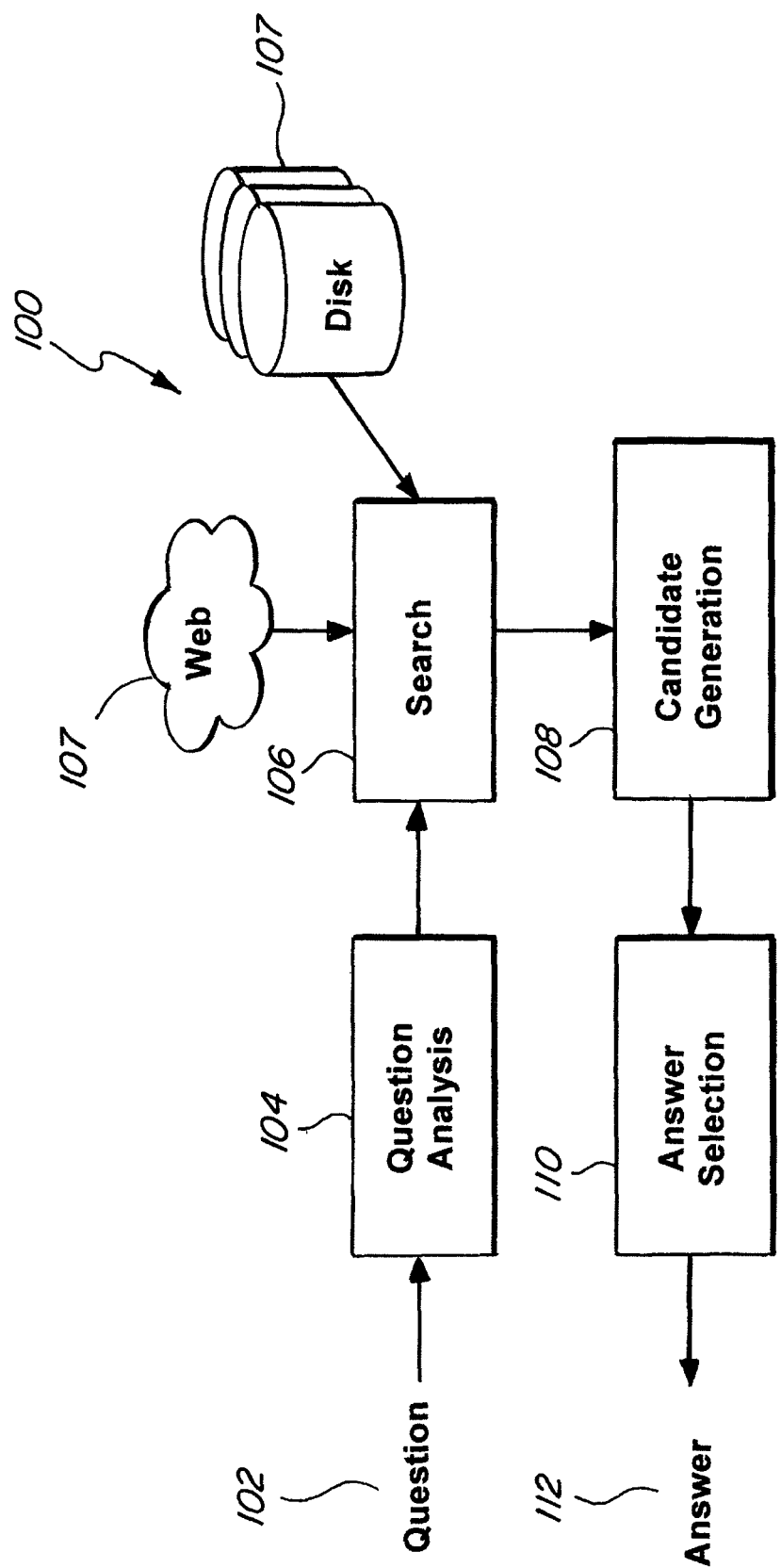
FIG. 1 illustrates the components of a canonical question answering system and its workflow.

Embodiments may be described herein in terms of various components and processing steps. It should be appreciated that such components and steps may be realized by any number of hardware and software components configured to perform the specified functions. For example, the embodiments may employ various electronic control devices, visual display devices, input terminals and the like, which may carry out a variety of functions under the control of one or more control systems, microprocessors or other control devices.

In addition, the embodiments may be practiced in any number of contexts and the exemplary embodiments relating to a searching system and method as described herein are merely a few of the exemplary applications. The processing steps may be conducted with one or more computer-based systems through the use of one or more algorithms.

FIG. 1 illustrates the components of a QA system 100 and its workflow, including question analysis component 104, search component 106, candidate generation component 108 and answer selection component 110.

In operation, the question analysis component 104 receives a natural language question 102, for example, "Who is the 42nd president of the United States?" Question analysis component 104 analyzes the question to produce, minimally, the semantic type of the expected answer (in this example, "president"), and optionally other analysis results for downstream processing.

The search component 106 formulates queries from the output of question analysis and consults various resources, for example, the world wide web and databases 107, to retrieve documents, passages, database tuples, and the like, that are relevant to answering the question.

The candidate generation component 108 then extracts from the search results potential answers to the question, which are then scored and ranked by the answer selection component 110 to produce a final ranked list of answers 112 with associated confidence scores.

Candidate generation component 108 is an important component in question answering systems in which potential answers to a given question are extracted from the search results. In a typical question answering system, candidate answers are identified based on the semantic type match between the answer type as determined by the question analysis component 104 and entities extracted from the search results via a named entity recognizer. For example, for the sample question "Who is the 42nd president of the United States?" all candidate answers will be of the semantic type US president.

FIGS. 2 and 3 are flow diagrams illustrating an approach to candidate answer generation by leveraging structural information in semi-structured resources, such as the title of a document and anchor texts in a document. This approach improves upon previous candidate generation methods by producing candidate answers in a context-dependent fashion without the reliance requiring high accuracy in on the high accuracy required of answer type detection and named entity recognition.

This approach is applicable to questions with both definitive semantic answer types as well as untyped questions, and improves overall system efficiency by generating a significantly smaller set of candidate answers through leveraging context-dependent structural information.

In certain types of documents, such as Encyclopedia articles and the like, the document title is an excellent candidate answer for properties described in the article about the title entity. For example, in a document about the band "The First Edition", the following facts are provided: "The First Edition was a rock band, stalwart members being Kenny Rogers, Mickey Jones, and Terry Williams. The band formed in 1967, with noted folk musicians Mike Settle and the operatically trained Thelma Camacho completing the lineup" and "The First Edition were (outside of Mickey Jones) made up of former New Christy Minstrels who felt creatively stifled." Given the question "What is the rock band formed by Kenny Rogers and other members of the New Christy Minstrels in 1967?" the search component 106 of QA system 100 is likely to include a document 202, for example "The First Edition" or passage texts 204 extracted from document 202 among its search results.

In one embodiment of the present invention, candidate generation component 108 performs document title approach 200 by extracting candidate answers from search results. If the search results include documents 202, then the "title field" of these documents, such as "The First Edition", is extracted using title retrieval component 208 as illustrated in FIG. 2. One implementation of title approach 200 may be done through a database table lookup. If the search results include passage texts 204, then the documents that contain passage texts 202a are retrieved through document retrieval component 206. This may be accomplished by retrieving the provenance information of the passage texts. Once the documents containing the passage texts 202a are obtained, the titles may be retrieved using title retrieval component 208 and are used as candidate answers 210.

In the event that search component 106 returns document 202 as its search result, title retrieval component 208 returns the title of document 202 as a candidate answer 210.

In the event that search component 106 returns a passage 204 (for example, a short 1-3 sentence text snippet), then a document 202a from which passage 204 has been extracted is searched for and identified using document retrieval component 206.

Document retrieval component 206 is configured to match passage 204 against a set of free-text records. These records could be any type of mainly unstructured text, such as newspaper articles, real estate records or paragraphs in a manual. Passages 204 may range from multi-sentence full descriptions of an information need to a few words.

Once document 202a has been identified, title retrieval component 208 returns the title of document 202a as a candidate answer 210.

In another embodiment, candidate generation component 108 includes anchor text retrieval approach 300, which leverages anchor texts found in a passage/document 302 to extract candidate answers 210 from text retrieved from passage/document 302. Anchor texts are text strings highlighted in a document to indicate hyperlinks to other documents.

As illustrated in FIG. 3, candidate generation component 108 uses anchor texts 304 as a candidate generation mechanism in QA system 100. For each document-oriented search result (i.e. passage or document 302) from search component 106, retrieve component 306 identifies the document from which the retrieved text has been extracted. Retrieve component 306 then retrieves all anchor texts 304 that are present in document 302. An implementation of using anchor texts 304 may be through a database lookup in which the database stores pairs of a document ID and a list of all anchor texts in that particular document. Given a search result, such as passage/document 302, the document ID of passage/document 302 may either be obtained through provenance information in the search result, if available, or retrieved again through retrieve component 306. Once the document ID is identified, the list of anchor texts 304 in that document may be obtained through a simple database query. The subset of the list of anchor texts that are present in passage/document 302 are selected as candidate answers 210.

Next, in match component 308, anchor texts 304 are matched against the retrieved text and all anchor texts 304 that are present in the retrieved text are selected as candidate answers 210.

It should be understood that the approaches described above regarding FIGS. 2 and 3 to candidate answer generation by leveraging structural information in semi-structured resources, such as the title of a document and anchor texts in a document, may be used separately or may be combined. For example, in one embodiment, anchor text retrieval approach 300 in which candidate generation component 108 uses anchor texts 304 as a candidate generation mechanism in QA system 100, may be applied to the candidate answers 210 extracted using document title approach 200. This is performed by treating each extracted candidate answer 210 from approach 200 as a search result (i.e. passage/document 302) and further extracting anchor text sub-candidates from within candidate answers 210. For example, for candidate answer 210 "List of Deserts in Australia", the candidate answer 210 "Australia" may be generated.

The present invention provides an approach to candidate answer generation by leveraging structural information in semi-structured resources, such as the title of a document and anchor texts in a document.

In one aspect, the invention provides a method for candidate generation for question answering including receiving a natural language question and formulating queries used to retrieve search results including documents and passages that are relevant to answering the natural language question; extracting from the search results potential answers to the natural language question; and scoring and ranking the answers to produce a final ranked list of answers with associated confidence scores.

The method for candidate generation for question answering includes receiving at least one document or passage together with its provenance information; accessing a semi-structured source of information based on the provenance; retrieving substructures/entities including a title of a document and anchor text from the passage within the document; applying a normalization operation, such as replacing the html symbol "&nsp;" with a space character or removing the disambiguation field in a Wikipedia article titles (e.g. removing the text in parenthesis for title Titanic (1997 film)), to the substructure/entity (e.g. titles and anchor texts); and returning the resulting list of candidate answers.

The approach improves upon previous generation methods by producing candidate answers in a context-dependent fashion without requiring high accuracy in answer type detection and named entity recognition. The approach is applicable to questions with both definitive semantic answer types as well as untyped questions, and in the latter case, improves overall system efficiency by generating a significantly smaller set of candidate answers through leveraging context-dependent structural information.

The embodiments have been disclosed in an illustrative manner. Accordingly, the terminology employed throughout should be read in an exemplary rather than a limiting manner. Although minor modifications of the embodiments will occur to those of ordinary skill in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

What is claimed is:

1. A method for candidate answer generation in a question answering system, comprising:
    receiving at least one document responsive to a search of an information source, the search being implemented based on a query formulated from a natural language query;
    receiving provenance information for the at least one document;
    searching a semi-structured source of information based on the provenance information;
    retrieving a substructure corresponding to the at least one document from the semi-structured source of information, the substructure corresponding to structured text; and
    returning the substructure as a candidate answer to the natural language query;
    wherein the substructure is anchor text of the document, and wherein the retrieving the substructure includes identifying the document from a database look up table that stores document identifiers and corresponding lists of anchor text, the method further comprising identifying anchor texts in the list that match the anchor texts in the document and selecting as candidate answers all of the anchor texts in the list that are present in the document.

2. The method of claim 1, wherein the anchor text includes text strings highlighted in the document, the text strings indicating hyperlinks to other documents.

3. A system for candidate answer generation in a question answering system, comprising:
    a memory having computer readable instructions; and
    a processor for executing the computer readable instructions, the instructions including:
    receiving at least one passage responsive to a search of an information source, the search being implemented based on a query formulated from a natural language query;
    receiving provenance information for the at least one passage;
    searching a semi-structured source of information based on the provenance information;
    retrieving a substructure corresponding to the at least one passage from the semi-structured source of information, the substructure corresponding to structured text; and
    returning the substructure as a candidate answer to the natural language query;
    wherein the substructure is anchor text of the passage, and wherein the retrieving the substructure includes identifying a document containing the passage from a database look up table that stores document identifiers and corresponding lists of anchor text, the instructions further comprising identifying anchor texts in the list that match the anchor texts in the passage and selecting as candidate answers all of the anchor texts in the list that are present in the passage.

4. The system of claim 3, wherein the anchor text includes text strings highlighted in the document, the text strings indicating hyperlinks to other documents.

5. A method for candidate answer generation in a question answering system, comprising:
    receiving at least one passage responsive to a search of an information source, the search being implemented based on a query formulated from a natural language query;
    receiving provenance information for the at least one passage;
    searching a semi-structured source of information based on the provenance information;
    retrieving a substructure corresponding to the at least one passage from the semi-structured source of information, the substructure corresponding to structured text; and
    returning the substructure as a candidate answer to the natural language query;
    wherein the substructure is anchor text of the passage, and wherein the retrieving the substructure includes identifying a document containing the passage from a database look up table that stores document identifiers and corresponding lists of anchor text, the method further comprising identifying anchor texts in the list that match the anchor texts in the passage and selecting as candidate answers all of the anchor texts in the list that are resent in the passage.

6. The method of claim 5, wherein the anchor text includes text strings highlighted in the document, the text strings indicating hyperlinks to other documents.

* * * * *